(12) United States Patent
Fusari et al.

(10) Patent No.: US 9,862,442 B2
(45) Date of Patent: Jan. 9, 2018

(54) BICYCLE CONTROL DEVICE

(71) Applicant: Campagnolo S.r.l., Vicenza (IT)

(72) Inventors: Flavio Fusari, Vicenza (IT); Davide Zenere, Vicenza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 19 days.

(21) Appl. No.: 14/873,981

(22) Filed: Oct. 2, 2015

(65) Prior Publication Data
US 2016/0096571 A1    Apr. 7, 2016

(30) Foreign Application Priority Data
Oct. 3, 2014    (IT) .............................. MI2014A1736

(51) Int. Cl.
| | |
|---|---|
| *B62J 6/00* | (2006.01) |
| *B62J 6/16* | (2006.01) |
| *B62K 23/02* | (2006.01) |
| *B62L 3/00* | (2006.01) |
| *B62M 25/08* | (2006.01) |
| *F21V 8/00* | (2006.01) |
| *B62J 99/00* | (2009.01) |

(52) U.S. Cl.
CPC . *B62J 6/00* (2013.01); *B62J 6/16* (2013.01); *B62K 23/02* (2013.01); *B62L 3/00* (2013.01); *B62M 25/08* (2013.01); *G02B 6/0001* (2013.01); *B62J 2099/008* (2013.01); *B62J 2099/0013* (2013.01)

(58) Field of Classification Search
CPC ........ B62J 6/00; B62J 6/16; B62J 2099/0013; B62J 2099/008; B62K 23/02; B62L 3/00; B62M 25/08; G02B 6/0001

USPC ................. 362/473, 559, 554, 474, 491, 511
See application file for complete search history.

(56) References Cited

U.S. PATENT DOCUMENTS

| | | | |
|---|---|---|---|
| 5,446,628 A * | 8/1995 | Blom | B60Q 1/0011 362/473 |
| 6,170,356 B1 | 1/2001 | Campagnolo | |
| 7,049,944 B2 * | 5/2006 | Uno | B62J 99/00 340/432 |
| 7,363,873 B2 * | 4/2008 | Iteya | B62J 6/00 116/28.1 |
| 7,703,350 B2 | 4/2010 | Fujii | |
| 7,841,255 B2 | 11/2010 | Fujii | |

(Continued)

FOREIGN PATENT DOCUMENTS

| | | |
|---|---|---|
| CN | 202806571 U | 3/2013 |
| DE | 102009005777 A1 | 8/2010 |

(Continued)

OTHER PUBLICATIONS

Italian Search Report and Written Opinion in Italian Application No. IT MI2014A001736, dated May 4, 2015 with English translation.

(Continued)

*Primary Examiner* — Laura Tso
(74) *Attorney, Agent, or Firm* — Volpe and Koenig, P.C.

(57) ABSTRACT

A bicycle control device that includes a control member with at least one transparent portion, and a luminous indicator. The luminous indicator includes a light source and a light guide that guides the light, through the phenomenon of total internal reflection, from the light source to the at least one transparent portion of the control member.

18 Claims, 4 Drawing Sheets

(56) References Cited

U.S. PATENT DOCUMENTS

| | | |
|---|---|---|
| 8,035,046 B2 | 10/2011 | Perini |
| 2004/0190302 A1 | 9/2004 | Mascardi et al. |
| 2006/0007693 A1* | 1/2006 | Grepper .................... B62J 6/02 |
| | | 362/474 |
| 2007/0014120 A1* | 1/2007 | Kitamura ................. B62J 6/001 |
| | | 362/473 |
| 2007/0235308 A1 | 10/2007 | Sharrah |
| 2008/0180233 A1 | 7/2008 | Miglioranza |
| 2010/0067245 A1 | 3/2010 | Fan |
| 2010/0199798 A1 | 8/2010 | Uno |
| 2012/0255390 A1 | 10/2012 | Warren et al. |
| 2014/0352478 A1 | 12/2014 | Gao |
| 2015/0284049 A1 | 10/2015 | Shipman et al. |

FOREIGN PATENT DOCUMENTS

| | | |
|---|---|---|
| EP | 1264765 A1 | 12/2002 |
| EP | 1820724 A2 | 8/2007 |
| EP | 1964763 A1 | 9/2008 |
| JP | 3166295 U | 2/2011 |
| JP | 2013006466 A | 1/2013 |
| TW | M427342 U | 4/2012 |

OTHER PUBLICATIONS

Italian Search Report and Written Opinion in Italian Application No. IT MI2014A001740, dated Jan. 7, 2015 with English translation.
Italian Search Report and Written Opinion in Italian Application No. IT MI2014A001739, dated May 11, 2015 with English translation.
European Search Report for Application No. EP15191077.5-1755, dated Dec. 10, 2015.
European Search Report for Application No. 15186833.8, dated May 24, 2017.
Sep. 13, 2017 Office Action for U.S. Appl. No. 14/873,971.

* cited by examiner

BICYCLE CONTROL DEVICE

CROSS REFERENCE TO RELATED APPLICATIONS

This application claims the benefit of Italian Application No. MI2014A001736, which was filed on Oct. 3, 2014, and is incorporated herein by reference as if fully set forth.

FIELD OF INVENTION

The present invention relates, in general, to a bicycle control device for imparting at least one mechanical command or an electrical-electronic command to at least one equipment of the bicycle, such as a brake, an electromechanical derailleur or a cyclecomputer.

BACKGROUND

In particular, the present invention relates to a bicycle control device provided with luminous indicator means.

Known bicycle control devices comprise one or more manually actuated control members, of the lever type, namely rigid bodies actuated with a rotary movement about a pivot or fulcrum, or of the button type, namely actuated with a linear movement, said manually actuated control members being actuatable with one finger or with several fingers. Typically, the manually actuated control members are supported by a body adapted to be fixed at a grip portion of the handlebars.

In the case of control devices for imparting at least one electrical-electronic command, the manually actuated control members typically act on respective electric switches, of the microswitch type, each including a deformable dome-shaped diaphragm. In order to switch the switches, an actuation head fixed to the respective manually actuated control member faces the deformable diaphragm in the rest condition of the manually actuated control member, and acts by pushing on the deformable diaphragm in the actuation condition of the manually actuated control member.

In greater detail, a bicycle typically comprises a rear brake associated with the rear wheel and/or a front brake associated with the front wheel, which are controlled by suitable control devices. Known brake control devices typically comprise a support body for fixing to the handlebars and a brake lever pivoted to the support body to actuate the brake by the traction of an inextensible cable, usually sheathed (Bowden cable), when it is pulled towards the handlebars.

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur is provided for.

A device for controlling the front derailleur and a device for controlling the rear derailleur—or only one of the two in the case of simpler gearshifts—are mounted so as to be easily manoeuvred by the cyclist, usually on the handlebars, close to the handgrips thereof where the brake lever for controlling the brake of the front and rear wheel, respectively, is also located.

Control devices that allow driving both a derailleur in the two directions and a brake are commonly called integrated controls.

Such integrated controls comprise, in particular, a brake lever, a first gearshift lever arranged behind the brake lever and a second gearshift lever arranged on a proximal surface of a support body of the control device, to command an electromechanical derailleur in the two directions.

In the present description and in the subsequent claims, the terms: outer, inner, upper, lower, front and rear refer to geometric and structural elements of the control device and of the bicycle and of the components forming them as they are oriented in the mounted and rest condition thereof and of bicycle handlebars. In particular, the terms outer and inner are used with reference to the considered element/component, so that an outer part/surface of the considered element/component is visible and an inner part/surface is hidden, in the mounted condition of the element/component.

By convention, the control device of the front derailleur and the brake lever of the front wheel are located close to the left handgrip, and vice-versa the control device of the rear derailleur and the brake lever of the rear wheel are located close to the right handgrip.

Control devices are also known wherein a single lever is capable of rotating about two or three axes to perform two or three functions among the brake control lever function, the upward gearshifting control lever function and the downward gearshifting control lever function.

Specialised racing handlebars are also known, which have two or four bars or ends facing prominently forwards, which allow the cyclist to maintain a position of the torso greatly inclined forwards, which is aerodynamically efficient. With these handlebars specific control devices are also used, both for the brakes and for the gearshift; these devices are commonly called bar-end since they are indeed housed at the ends of the handlebars, so that the cyclist can actuate them easily without having to change his position.

In the case of an electronically servo-assisted gearshift, one or two control levers can be used to impart a command to increase the gear ratio and a command to reduce the gear ratio, a control electronics that suitably drive the front and/or rear derailleur to actuate each command being provided for.

Moreover, in the case of an electronically servo-assisted gearshift, each derailleur comprises a chain guide element, also called cage, moveable to displace the chain among toothed wheels in order to change the gear ratio and an electromechanical actuator to move the chain guide element. The actuator in turn typically comprises a motor, typically an electric motor, coupled to the chain guide element through a linkage such as an articulated parallelogram, a rack system or a worm screw system, as well as a sensor of the position, speed and/or acceleration of the rotor or of any mobile part downstream of the rotor, down to the chain guide element itself. It is worthwhile noting that slightly different terminology from that used in this context is also in use.

In the case of a mechanical gearshift, the motor is absent and the linkage of the derailleurs is controlled through the traction of an inextensible cable, usually sheathed (Bowden cable), when the gearshifting control lever is actuated.

The present invention applies to all the types of control members described above and in principle to any lever suitable for imparting commands to equipments of the bicycle, such as a brake, a derailleur, a so-called cyclecomputer.

In bicycles there may also be control electronics that monitors the state of various sensors of one or more variables such as the travel speed, the cadence of rotation of the pedal cranks, the torque applied to the pedal cranks, the slope of the travel terrain, the heart rate of the cyclist and similar.

In the case of an electronic gearshift, the control electronics can also change the gear ratio automatically based on such detected variables, or aid the manual control of the electronic gearshift.

Luminous indicator devices for a bicycle are also known, for example presence luminous indicators and/or direction luminous indicators.

Such luminous indicator devices typically comprise a presence and/or direction indicator fixed to the front of the bicycle, a presence and/or direction luminous indicator fixed to the back of the bicycle and on/off means of the front and rear luminous indicators, typically arranged at the handlebars of the bicycle and in electrical connection, via cable or wirelessly, to the front and rear luminous indicators.

JP 3166295 U describes a control lever of a bicycle brake having luminous indicator means for indicating the position of the bicycle to other vehicles or to pedestrians. The luminous indicator means are preferably fixed directly on the surface of the brake lever, in one embodiment they are fixed in a groove of the brake lever with snap means. The luminous indicator means comprise a substrate with at least one luminous emission element covered by a transparent cover. A power source of the luminous indicator means is located on the brake lever. In the case of a electric-power-assisted bicycle, the power source of the luminous indicator means is provided on the body of the bicycle.

Starting from such a prior art, the technical problem of the invention is to provide a bicycle control device in which luminous indicator means are associated with a control member of the device in a practical and effective manner.

SUMMARY OF THE INVENTION

The present invention relates to a bicycle control device having a control member and a luminous indicator wherein the luminous indicator comprises a light source and a light guide configured to guide the light, through the phenomenon of total internal reflection, from the light source to at least one portion of the control member that is substantially transparent.

The use of a light guide to guide the light from the light source makes it possible to displace the light source from the control member to a position of the control device that is more practical and spacious and more easily accessible by electrical connections and, at the same time, to effectively light the control member. Thus, the luminous indicator is associated with the control member in a practical and effective manner.

BRIEF DESCRIPTION OF THE DRAWINGS

Features and advantages of the present invention will become clearer from the following detailed description of some embodiments thereof, made hereafter for indicative and not limiting purposes with reference to the attached drawings. The different features illustrated and described with reference to the single configurations can be combined with each other as desired. In the drawings.

In the following description, to illustrate the figures identical or similar reference numerals are used to indicate constructive elements with the same or analogous function.

DETAILED DESCRIPTION OF THE PREFERRED EMBODIMENTS

Figure 1:
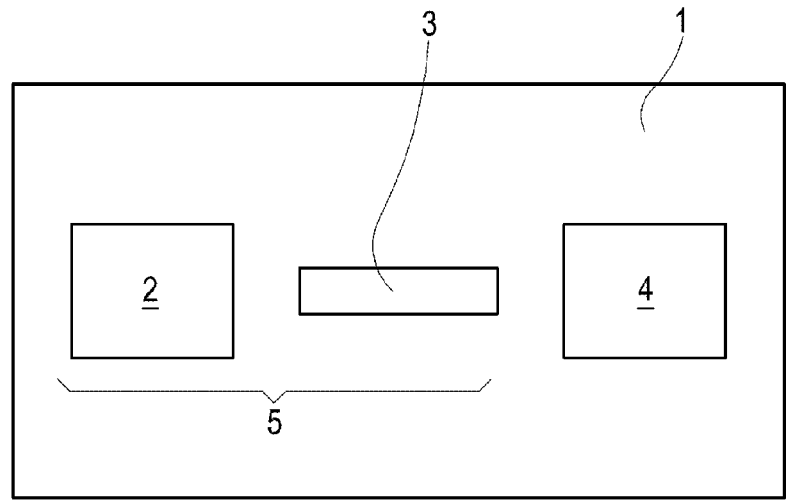
FIG. 1 schematically shows a control device according to the invention.

In the present description and claims, the expression "substantially transparent" indicates a physical property of a material that allows a substantial part of light, preferably 100%, to pass through the material.

Preferably, the control device comprises a support for the control member, the light source being housed in the support.

This embodiment, foreseeing to displace the light source from the control member to the support of the control member, advantageously makes it possible to house the light source in a more spacious and easily accessible position with respect to the control member itself. Moreover, in the case of an electrical-electronic control device with support already provided with power supply and circuit board, this embodiment makes it possible to substantially simplify the electrical connection of the light source to the power supply and, possibly, to the circuit board.

Preferably, the support comprises electrical connection means of the light source to power supply means.

Preferably, the support comprises a circuit board for controlling said light source, electrically connected to said light source.

Preferably, said circuit board is in communication with control electronics of the bicycle. The communication between the circuit board and the control electronics of the bicycle can be of the wireless or wired type.

Preferably, said at least one portion of the control member that is substantially transparent extends for a large part of, more preferably all, the thickness of the control member. This advantageously makes it possible to light such a portion of the control member for a large part of or all its thickness and not only superficially and to obtain better lighting.

In a preferred embodiment, said at least one portion of the control member that is substantially transparent constitutes the totality of the control member.

In another preferred embodiment, said at least one portion of the control member that is substantially transparent is formed in one piece with a remaining portion of the control member. Preferably, the remaining portion of the control member is opaque. For example, the remaining portion of the control member can be made of composite material comprising a matrix of polymeric material and structural fibres. The polymeric material can be of the thermosetting or thermoplastic type and the structural fibres are preferably selected from the group consisting of carbon fibres, glass fibres, aramid fibres, ceramic fibres, boron fibres and combinations thereof. Carbon fibres are particularly preferred.

Preferably, the light guide is optically coupled to the light source and with said at least one portion of the control member that is substantially transparent.

In a preferred embodiment, the light guide is a distinct piece from the control member.

Preferably, the light guide is housed in the support for the control member.

In another preferred embodiment, the light guide is made at least partially from said at least one portion of the control member that is substantially transparent.

In a preferred embodiment, the control member is made as a distinct piece from said support and is mechanically coupled to it, for example through hinging.

In this case, the support is preferably adapted to be mounted on the handlebars of a bicycle in a fixed manner.

In another preferred embodiment, the control member is made as one piece with the support for the control member. This embodiment is advantageously adapted to be used with a control device of the bar-end type.

In this embodiment, preferably the control device comprises a body adapted to be mounted on the handlebars of a bicycle in a fixed manner, the support for the control member being rotatably coupled to said body. In this embodiment, the light source is preferably housed in the support that is preferably in one piece with the control member. In this embodiment, the light guide is preferably made at least partially from said at least one portion of the control member that is substantially transparent. Thanks to these features, the light source remains optically coupled in a stable manner to the light guide during the movement of the support for the control member with respect to said body. In particular, the position between the light source and the light guide remains unchanged during the actuation of the control member by a cyclist.

The control device can be one of the various control devices described above.

Preferably, the control device is of the electrical-electronic type. Alternatively, the control device is of the mechanical type.

In the case of an electrical-electronic control device, preferably the control device comprises an electric switch and an actuation head of the electric switch, adapted to actuate the electric switch upon the actuation of the control member by a cyclist.

Preferably, the actuation head is adapted to face the electric switch in the rest condition of the control member, and to act by pushing on the electric switch in the actuation condition of the control member.

In a preferred embodiment, the control member is fixedly connected to the actuation head, i.e. it is a single piece with the actuation head or it is a distinct piece but connected to the actuation head so that they move as if they were a single piece. In this way, the movement of the control member by a cyclist is transmitted to the actuation head so as to cause a change of state of the electric switch.

In a preferred embodiment, the light guide is preferably at least partially arranged between the actuation head and the switch.

In this embodiment, the actuation head is made of substantially transparent material. In this embodiment, the light guide is preferably optically coupled to the light source, on one side, and with the actuation head, on the other side, and it is configured so as to guide the light from the light source to said at least one portion of the control member that is substantially transparent, through the actuation head.

In another preferred embodiment, the actuation head is adapted to interact directly with the switch, in other words without interposition of the light guide.

In a preferred embodiment, the control member is fixedly connected to the switch, i.e. it is a single piece with the switch or it is a distinct piece but connected to the switch so that they move as if they were a single piece. In this way, the movement of the control member by a cyclist is transmitted to the switch so that is does or does not interact with the actuation head.

In this embodiment, the switch is preferably mounted on a circuit board that is fixedly connected to the control member; i.e. the circuit board is a single piece with the control member or it is a distinct piece but connected to the control member so that they move as if they were a single piece. The circuit board is preferably housed in said support that is preferably made in one piece with the control member. Preferably, the actuation head is housed in a body of the control device that is rotatably coupled to the support and is adapted to be mounted on the handlebars of a bicycle in a fixed manner. This embodiment is advantageously adapted to be used with a control device of the bar-end type.

The control member can be one of the various control members described above.

Preferably, the control member at least partially projects from the support.

Preferably, said control member is a control lever.

Preferably, said control member is a control lever of a derailleur, in at least one gearshifting direction (upward and/or downwards).

Alternatively, said control member can be a control lever of a brake.

In an alternative embodiment, said control member is of the button type, for example a control button of a cyclecomputer.

Preferably, said light source comprises at least one LED of the white light or multicolour type, for example RGB (Red-Green-Blue).

Alternatively or in addition, said light source can comprise at least one Organic Light-Emitting Diode (OLED).

FIG. 1 schematically shows a control device 1 according to the invention comprising a control member 4 and luminous indicator means 5. The luminous indicator means 5 comprise a light source 2 and a light guide 3 configured to guide the light, through the phenomenon of total internal reflection, from the light source 2 to at least one portion of the control member 4 that is made of substantially transparent material.

As will become clear from the following description, even if in FIG. 1 the blocks representative of the light guide 3 and of the control member 4 are illustrated as two distinct elements, the invention also comprises the case in which the light guide 3 is at least partially integrated in the control member 4 (see, for example, the embodiment described with reference to FIGS. 5-7).

Figure 2:
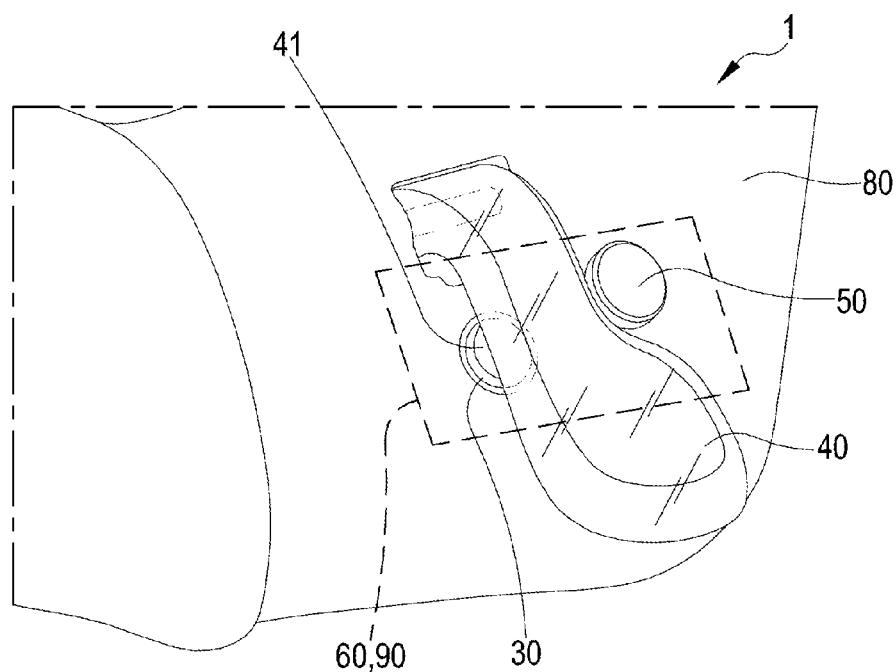
FIG. 2 is a perspective view of a portion of a bicycle control device according to a first embodiment of the invention.
Figure 3:
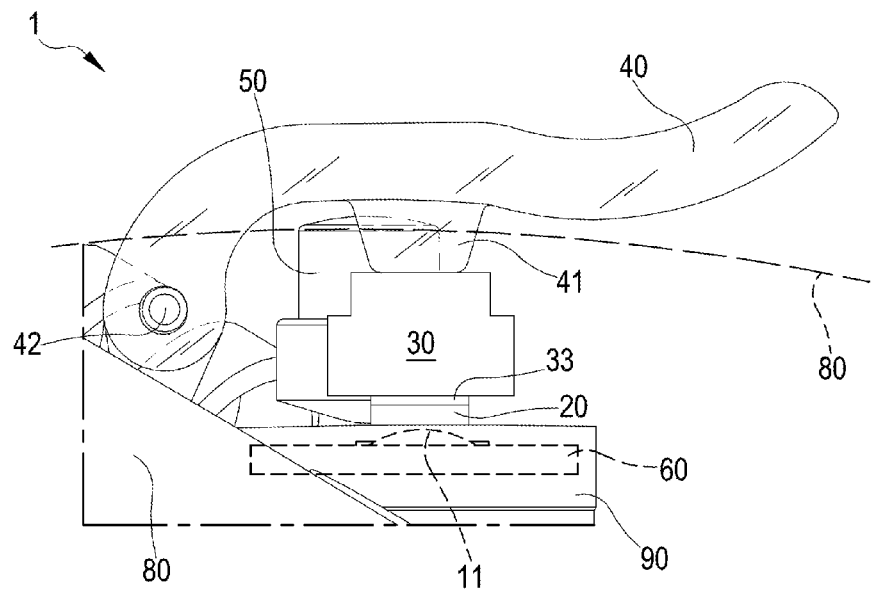
FIG. 3 shows the main components of the control device of FIG. 2, seen from a first direction.
Figure 4:
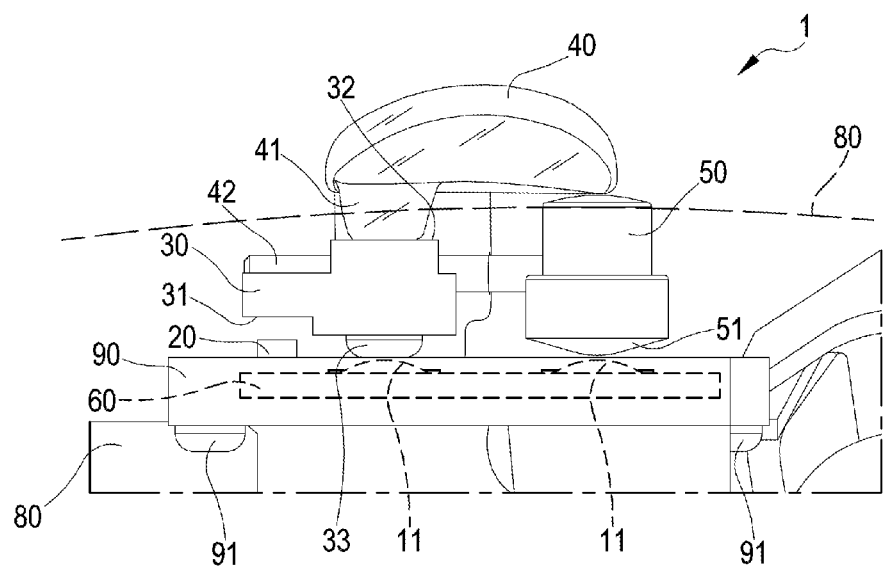
FIG. 4 shows the components of FIG. 4, seen from a second direction.

With reference to FIGS. 2 to 4, a portion of the bicycle control device 1 is illustrated according to a first preferred embodiment of the invention.

In this embodiment, the control member 4 comprises a gearshift lever 40 of a derailleur (not illustrated). The shown gearshift lever 40 is a right control member, i.e. intended to be associated with the right end of bicycle handlebars, to be actuated by the cyclist with the right hand. A lever for a control device intended to be associated with the left end of the handlebars will be substantially the mirror image. In particular, the shown gearshift lever 40 is a downward gearshift lever of the rear derailleur.

Although what is described in the rest of the present description refers to a downward gearshift lever, it applies in an analogous way (which will be clear to the man skilled in the art based on the present description) also to any other control member of the bicycle like, for example, an upward gearshift lever of the front or rear derailleur or a brake lever or an actuation button of a cyclecomputer.

The control device 1 is of the electrical-electronic type. In the illustrated example, it comprises three control members: the downward gearshift lever 40, an upward gearshift lever (of the rear derailleur, not shown) and a button 50 for actuating a cyclecomputer.

The control members 40, 50 can be actuated by a cyclist with a finger or with several fingers. The downward gearshift lever 40 and the upward gearshift lever can be actuated through a rotary movement about a pivot or fulcrum (see FIG. 3 where the pivot 42 of the downward gearshift lever 40 is illustrated). In turn, the actuation button 50 is actuated with a linear movement.

The control members 40, 50 are supported by a support 80. The support 80 is adapted to be fixed at a handgrip portion of the handlebars. The support 80 is fixedly connected to the handlebars, i.e. it is connected to the handlebars so that they move as if they were a single piece.

The support 80, the downward gearshift lever 40, the upward gearshift lever and the button 50 are preferably made of composite material (with the same or different composition to each other), comprising a matrix of polymeric material and structural fibres. The polymeric material can be of the thermosetting or thermoplastic type and the structural fibres are preferably selected from the group consisting of carbon fibres, glass fibres, aramid fibres, ceramic fibres, boron fibres and combinations thereof. Carbon fibres are particularly preferred.

The control device 1 preferably comprises a protective sheath, for example made of rubber, to cover the support 80 except for the downward gearshift lever 40 and the upward gearshift lever.

The control device 1 comprises a Printed Circuit Board (PCB) 60.

Three electrical switches 11 are mounted and electrically connected on the circuit board 60. The electrical switches 11 are of the microswitch type, each including a deformable dome-shaped diaphragm.

The downward gearshift lever 40, the upward gearshift lever and the actuation button 50 are associated with three respective actuation heads of the switches 11 (in the figures only the actuation heads 41, 51 of the downward gearshift lever 40 and of the button 50 are shown, the actuation head associated with the upward gearshift lever not being shown). Such actuation heads 41, 51 may or may not be in one piece with the downward gearshift lever 40, the upward gearshift lever and the button 50. The actuation heads 41, 51 are configured so as to face the deformable diaphragm of the switches 11 in the rest condition, respectively, of the downward gearshift lever 40, upward gearshift lever and actuation button 50, and to act by pushing on the deformable diaphragm in the actuation condition of the respective control member.

The light source, indicated with reference numeral 20, comprises one or more LEDs of the white light or, preferably, multicolour type, for example RGB (Red-Green-Blue).

In the embodiment illustrated in FIGS. 2-4, the light guide, indicated with reference numeral 30, is optically coupled, at an inlet end 31, to the light source 20 and, at an outlet end 32, to the downward gearshift lever 40. Preferably, the light guide 30 is a distinct piece from the downward gearshift lever 40. However, the light guide 30 could be made in one piece with the downward gearshift lever 40.

In the illustrated example, a portion of the light guide 30, including the outlet end 32, is arranged between the actuation head 41 of the downward gearshift lever 40 and the deformable diaphragm of the respective switch 11. In order to allow, during the actuation of the downward gearshift lever 40, an appropriate transmission of the thrust exerted by the actuation head 41 to the deformable diaphragm of the switch 11, the material of the light guide 30 (or at least its portion arranged between the actuation head 41 and the deformable diaphragm of the switch 11) is substantially rigid, not deformable/yielding. Moreover, in order to avoid wearing of the switch 11, the portion of the light guide 30 that faces the deformable diaphragm of the switch 11 is preferably associated with a semi-spherical protuberance 33 made of rubber.

As shown in FIG. 4, the light source 20 is preferably misaligned with respect to the deformation axis of the deformable diaphragm of the switch 11 associated with the downward gearshift lever 40.

The light guide 30 is made at least partially from plastic material that is substantially transparent to the light emitted by the light source 20. For example, the substantially transparent plastic material can be selected from the group consisting of glass fibre, polyvinylchloride (PVC), polyamide (PA), polyethylene (PE) and combinations thereof.

The light guide 30 is configured (in terms of materials, configuration, dimensions etc.), according to techniques known to the man skilled in the art that exploit the phenomenon of total internal reflection, so as to guide the light emitted by the light source 20 towards the inside of the downward gearshift lever 40, passing through the actuation head 41.

In order to allow light to be transmitted and an appropriate (whole or partial) lighting of the downward gearshift lever 40, the downward gearshift lever 40 and the actuation head 41 are preferably made entirely or at least partially from plastic material that is substantially transparent to the light emitted by the light source 20. For example, the substantially transparent plastic material can be selected from the group consisting of glass fibre, PVC, PA, PE and combinations thereof.

Preferably, the substantially transparent plastic material extends for the entire thickness of the downward gearshift lever 40, which goes from an upper surface to a lower surface thereof. This advantageously makes it possible to light the downward gearshift lever 40 for its entire thickness and not only superficially and to thus obtain better lighting.

The substantially transparent plastic material acts as a means for diffusing the light emitted by the light source 20 and guided by the light guide 30 so that the downward gearshift lever 40 is entirely (or partially) lit. Such lighting can advantageously be used to provide the cyclist with a visual indication of one or more variables detected by on-board control electronics (not shown), like, for example, the travel speed, the heart rate of the cyclist, the gearshifting sequence, the slope of the travel terrain, and similar. The visual indication may or may not be linked to the use of the downward gearshift lever 40.

The light source 20 is mounted on a circuit board 60 and electrically connected to it so as to be able to be controlled by it.

The light source 20 is also electrically connected to a power source (not shown), like for example a battery. The power source is preferably housed in a suitable seat formed in the circuit board 60.

The power source can be a battery of the primary or rechargeable type, preferably of the button type.

The circuit board 60 is preferably housed in a containment body 90, preferably airtight, which is fixed to the support 80 through screws 91. Alternatively or in addition, the circuit board 60 can be co-moulded with a film of plastic that makes it waterproof and protects it from dust.

The circuit board 60 is adapted to communicate with the on-board control electronics to control the switching on of the light source 20 as a function, for example, of variations of the variables detected by the control electronics.

As an example, the circuit board 60 can control the turning on of the light source 20 and/or can control the change in colour and/or a flashing operation of the light source 20, as well as the flashing frequency thereof, so as to indicate the current speed, gear ratio or heart rate, etc.

The communication between the circuit board 60 and the control electronics of the bicycle can take place in a wireless or wired manner. In the second case, an electric cable (not shown) is foreseen, preferably provided with a connector. In this case, the electric cable can also be used to power the light source 20, in which case the power source is omitted.

Figure 5:
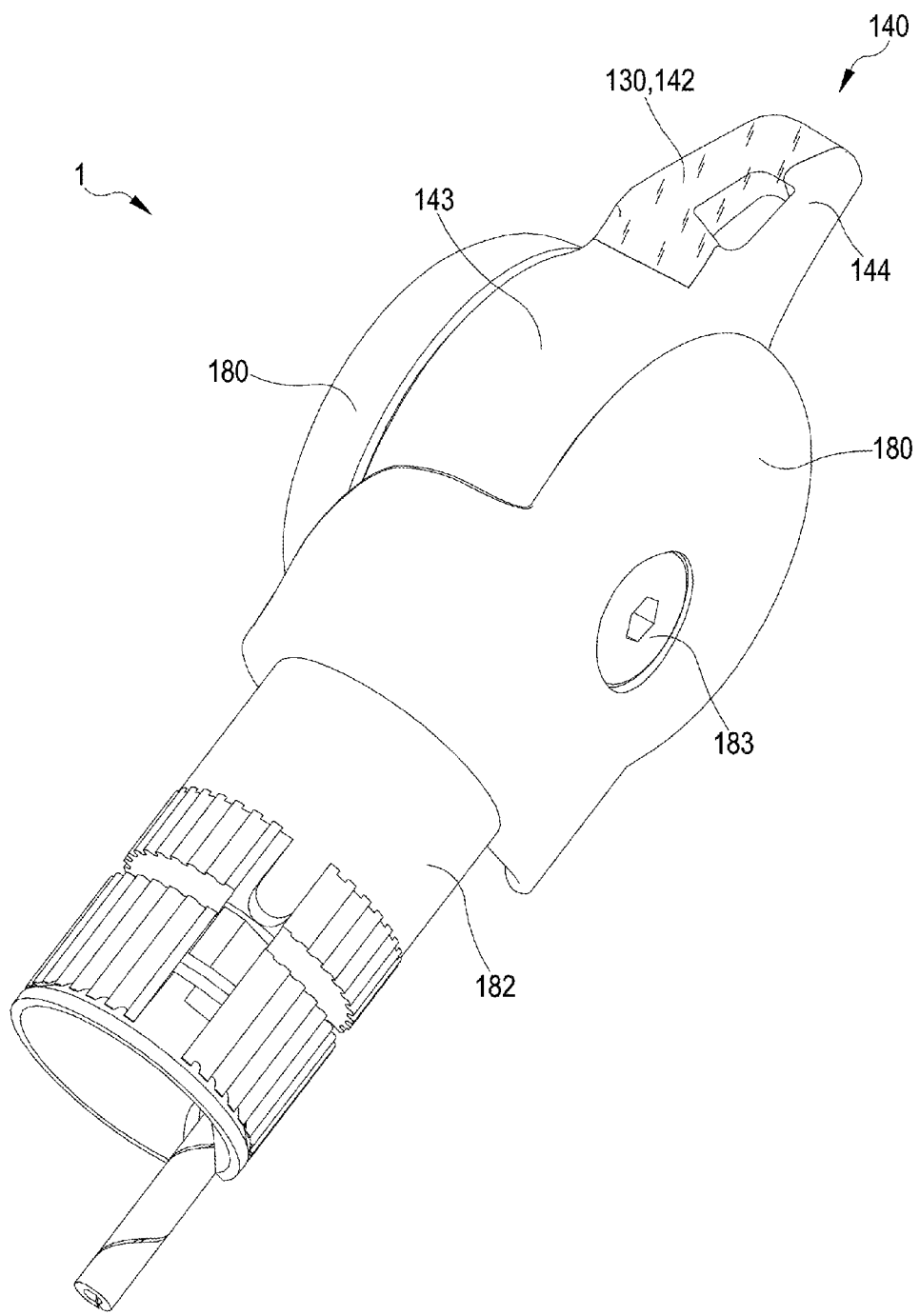
FIG. 5 is a perspective view of a bicycle control device according to a second embodiment of the invention.
Figure 6:
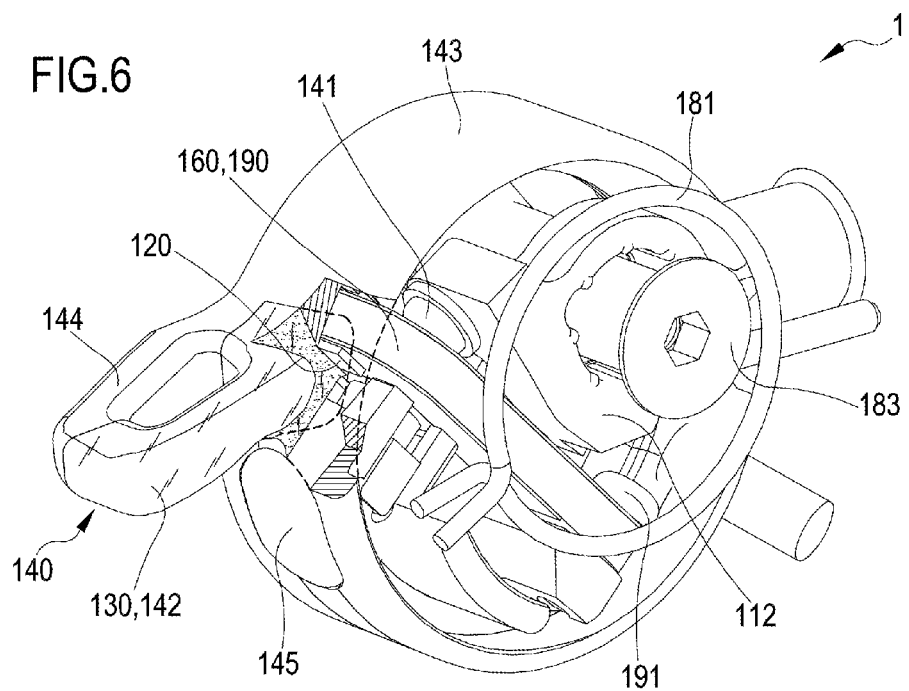
FIG. 6 is another perspective view of the control device of FIG. 5, in which a part of the body for fixing to the handlebars is removed.
Figure 7:
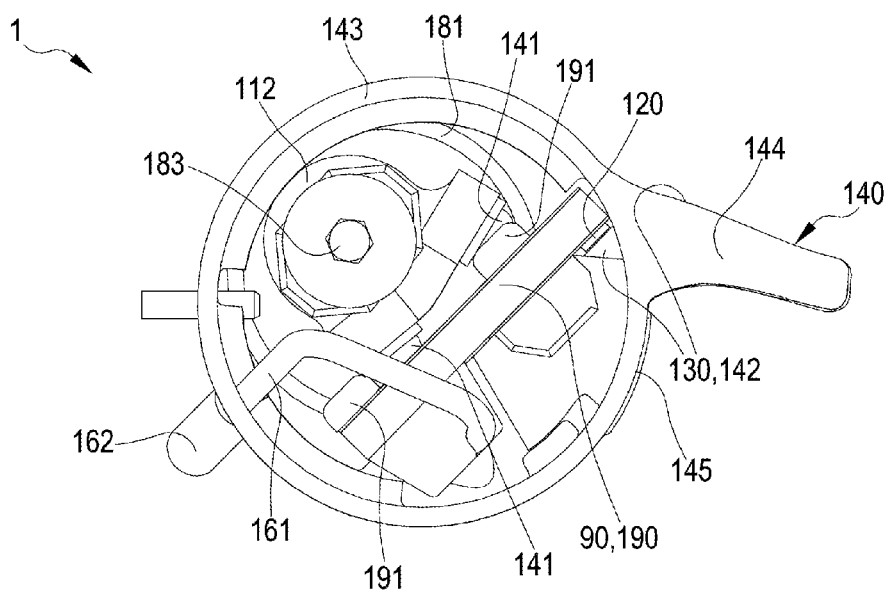
FIG. 7 is a side view of the control device of FIG. 5, in which a part of the body for fixing to the handlebars is removed.

With reference to FIGS. 5 to 7, they illustrate a bicycle control device 1 according to another embodiment of the present invention. Constructive elements with the same or analogous function to that of FIGS. 2-4 are indicated with corresponding reference numerals with a further number "1" in front (in other words increased by 100) and the device 1 of this embodiment is only described in the elements that differ from the embodiment described above with reference to FIGS. 2 to 4.

In this embodiment, the control device 1 is electrical-electronic of the bar-end type. As already described above, these control devices are typically used with specialised handlebars for racing, which have two or four bars/appendages facing substantially forwards, which allow the cyclist to maintain a position of the torso greatly inclined forwards, which is aerodynamically efficient. Bar-end control devices are indeed housed at the ends of the handlebars, so that the cyclist can actuate them easily without having to change his position.

In this embodiment, the control member 4 comprises a gearshift lever 140 of a derailleur (not illustrated). In particular, the shown gearshift lever 140 is both a downward and upward gearshift lever of the rear derailleur.

The shown gearshift lever 140 is a right control member, i.e. intended to be associated with the right end of a bicycle handlebars, to be actuated by the cyclist with the right hand. A lever for a control device intended to be associated with the left end of the handlebars will substantially mirror this.

The control device 1 comprises a body 180 adapted to be fixed at a portion of the bicycle handlebars. The body 180 is substantially cylindrical. Preferably, the body 180 comprises a tubular portion 182 that projects from the substantially cylindrical body and is provided with means for coupling with a bar/appendage (not shown) of the handlebars. The body 180 is thus fixedly connected to the handlebars of the bicycle, i.e. it is connected to the handlebars so that they move as if they were a single piece.

Preferably, the body 180 is made of composite material comprising a matrix of polymeric material and structural fibres. The polymeric material can be of the thermosetting or thermoplastic type and the structural fibres are preferably selected from the group consisting of carbon fibres, glass fibres, aramid fibres, ceramic fibres, boron fibres and combinations thereof. Carbon fibres are particularly preferred.

The body 180 comprises two substantially cylindrical shells, coupled together by suitable coupling means like, for example, a screw 183.

Between the two shells a substantially cylindrical mobile portion 143 is arranged that defines a support for the gearshift lever 140. In particular, the gearshift lever 140 projects from the mobile portion 143 and is preferably made in one piece with the mobile portion 143. The mobile portion 143 is rotatably coupled to the body 180. The mobile portion 143 and at least part of the gearshift lever 140 are preferably made of composite material comprising a matrix of polymeric material and structural fibres.

The mobile portion 143 is preferably provided with an access with a cover 145 that can be opened to inspect the inside of the control device 1.

The gearshift lever 140 can be actuated downwards or upwards by a cyclist with one finger or with several fingers. In particular, the gearshift lever 140 can be actuated downwards or upwards through a rotary movement in the clockwise or anti-clockwise direction of the mobile portion 143 with respect to the body 180.

The control device 1 comprises a Printed Circuit Board (PCB) 160. The circuit board 160 is preferably housed in a containment body 190, preferably airtight, which is fixed through suitable coupling means like, for example, screws 191 to the mobile portion 143. The circuit board 160 is, therefore, fixedly connected to the mobile portion 143, i.e. it is connected to the mobile portion 143 so that they move as if they were a single piece.

The communication between the circuit board 160 and the control electronics of the bicycle can take place in a wireless or wired manner. In the illustrated embodiment, the communication takes place in a wired manner through an electric cable 161 provided with a connector 162.

Two electrical switches (not shown) are mounted on, and electrically connected to, the circuit board 160. The electrical switches are of the microswitch type, each including a deformable dome-shaped diaphragm. The electrical switches are respectively associated with a downward gearshifting command and with an upward gearshifting command of the derailleur.

The control device 1 also comprises a pusher 112. The pusher is fixedly connected to the body 180 and is fixed to it through the coupling screw 183. The pusher 112 has two actuation heads 141, respectively able to be activated on the two switches. The actuation heads 141, preferably provided with semi-spherical ends coated with rubber, are configured so as to face the deformable diaphragm of the switches in the rest condition of the gearshift lever 140 and to act by pushing on the deformable diaphragm of the respective switch in one of two opposite actuation conditions (downwards or upwards) of the gearshift lever 140.

The circuit board 160 rotates as a unit with the mobile portion 143 so that a rotation of the mobile portion 143 in the clockwise/anti-clockwise direction (in other words a downward/upward actuation condition of the gearshift lever 140) causes a rotation of the circuit board 160 in the clockwise/anti-clockwise direction and, therefore, the interaction of one or other of the two switches with the respective actuation head 141.

The two switches with the two respective actuation heads 141 are located on opposite sides with respect to the plane containing the rotation axis of the mobile portion 143. In this way, a rotation of the circuit board 160 in one direction is adapted to make one of the two actuation heads 141 active on only one of the two switches and a rotation of the circuit board 160 in the opposite direction is adapted to make the other of the two actuation heads 141 active only on the other of the two switches.

The control device 1 comprises a spring 181. The spring 181 is configured substantially like a ring and has one end fixed to the mobile portion 143 and another end fixed to the body 180. In this way, the spring—biased in two opposite directions during a downward or upward activation of the gearshift lever 140 (in other words during a rotation in the clockwise or anti-clockwise direction of the mobile portion 143)—is adapted to exert a return force on the mobile portion 143 so as to take it back into a rest position, once the actuation of the gearshift lever 140 by the cyclist has ended.

The light source, indicated with reference numeral 120, comprises one or more LEDs 120 of the white light or, preferably, multicolour type, for example RGB (Red-Green-Blue).

The light source 120 is mounted on the circuit board 160 and electrically connected to it so as to be able to be controlled by it.

In the embodiment illustrated in FIGS. 5-7, the light guide, indicated with reference numeral 130, is made from a portion 142 of the gearshift lever 140 that is made of plastic material that is substantially transparent to the light emitted by the light source 120. In particular, the gearshift lever 140 comprises such a portion 142 of substantially transparent material and a portion 144 made of the same material (opaque) as the mobile portion 143. The two portions 142, 144 are preferably made as a single piece (for example, co-moulded). For example, the substantially transparent plastic material can be selected from the group consisting of glass fibre, PVC, PA, PE and combinations thereof.

The portion 142 of substantially transparent material preferably extends for the entire thickness of the gearshift lever 140, which goes from an upper surface to a lower surface thereof. This advantageously allows such a portion 142 of substantially transparent material to be lit for its entire thickness and not only superficially and thus allows better lighting to be obtained.

The light guide 130 is optically coupled to the light source 120.

In the embodiment illustrated in FIGS. 5-7, the light source 120 is located on a surface of the circuit board 160 that is opposite that in which the switches are located and in a position adapted to ensure an efficient light coupling with the light guide 130.

Considering that the circuit board 160 moves as a unit with the mobile portion 143 and with the gearshift lever 140 and that the light source 120 moves as a unit with the circuit board 160, the position between the light source 120 and the light guide 130 (which is made from the portion 142 of the gearshift lever 140) is fixed and advantageously remains unchanged during the movement of the gearshift lever 140.

The light guide 130 is configured (in terms of materials, shape, dimensions etc.) to guide, according to techniques known to the man skilled in the art that exploit the phenomenon of total internal reflection, the light emitted by the light source 120 inside at least part of the substantially transparent portion 142 of the gearshift lever 140. At the same time, the light guide 130 is also configured to allow the guided light to exit at predetermined positions/areas (for example exploiting suitable diffusion means inside the waveguide 130) of said substantially transparent portion 142. The gearshift lever 140 is thus partially lit.

As already explained above, such lighting can be advantageously used to provide the cyclist with a visual indication of one or more variables detected by on-board control electronics (not shown), like, for example, the travel speed, the heart rate of the cyclist, the gearshifting sequence, the slope of the travel terrain, and similar. The visual indication may or may not be linked to the use of the gearshift lever 140.

Alternatively or in addition, such lighting can advantageously act as a means for indicating to third parties the presence of and/or the intention of the cyclist to change direction of the bicycle.

As far as further structural and functional features of the light source 120, of the circuit board 160, of the power supply of the light source 120 are concerned, reference is made to what already described above with reference to the embodiment illustrated in FIGS. 2 to 4.

The above is a description of various embodiments of inventive aspects, and further changes can be made without departing from the scope of protection of the present invention. The shape and/or size and/or position and/or orientation of the various components can be changed. The functions of one element can be carried out by two or more components, and vice-versa. Components shown directly connected or in contact can have intermediate structures arranged between them. Steps shown directly consecutive can have intermediate steps carried out between them. The details shown in a figure and/or described with reference to a figure or to an embodiment can be applied to other figures or embodiments. Not all of the details shown in one figure or described in the same context necessarily have to be present in a same embodiment. Features or aspects that are innovative with respect to the prior art, alone or in combination with other features, should be considered to be described per sé, independently of what has been explicitly described as innovative.

Only as an example, although in the embodiment illustrated in FIGS. 5 to 7 the case of a fixed pusher 112 and mobile circuit board 160 has been foreseen, the invention applies in general to the case of relative motion between pusher 112 and circuit board 160. For example, it is possible to provide an opposite solution of a mobile pusher 112 (fixedly connected to the mobile portion 143) and fixed circuit board 160 (fixedly connected to the body 180).

What is claimed is:

1. A bicycle control device comprising a control member and luminous indicator, the luminous indicator comprising a light source,
   wherein the luminous indicator comprises a light guide configured to guide the light, through the phenomenon of total internal reflection, from the light source to at least one portion of the control member that is substantially transparent.

2. The control device according to claim 1, comprising a support for the control member, the light source being housed in the support.

3. The control device according to claim 2, wherein the support comprises an electrical connection of the light source to power supply and a circuit board for controlling said light source, electrically connected to said light source.

4. A bicycle control device comprising a control member and luminous indicator, the luminous indicator comprising a light source,
   wherein the luminous indicator comprises a light guide configured to guide the light, through the phenomenon of total internal reflection, from the light source to at least one portion of the control member that is substantially transparent, wherein said at least one portion of the control member that is substantially transparent extends for a large part of a thickness of the control member.

5. The control device according to claim 1, wherein said at least one portion of the control member that is substantially transparent constitutes the totality of the control member.

6. The control device according to claim 1, wherein the light guide is a distinct piece from the control member.

7. The control device according to claim 2, wherein the light guide is housed in the support for the control member.

8. The control device according to claim 1, wherein the light guide is made at least partially from said at least one portion of the control member that is substantially transparent.

9. The control device according to claim 2, wherein the control member is made as a distinct piece from said support for the control member and is mechanically coupled to it.

10. The control device according to claim 2, wherein the control member is made as one piece with said support for the control member.

11. The control device according to claim 2, further comprising a body adapted to be mounted on the handlebars of a bicycle in a fixed manner, the support for the control member being rotatably coupled to said body.

12. The control device according to claim 1, further comprising an electric switch and an actuation head of the electric switch, adapted to actuate the electric switch upon the actuation of the control member by a cyclist.

13. The control device according to claim 12, wherein the control member is fixedly connected to the actuation head.

14. The control device according to claim 12, wherein the light guide is at least partially arranged between the actuation head and the switch.

15. The control device according to claim 12, wherein the control member is fixedly connected to the switch.

16. A bicycle control device comprising:
    a control member having at least one portion that is both substantially transparent and manually actuatable; and,
    a luminous indicator comprising a light source and a light guide,
    wherein the light guide is configured to guide the light, through the phenomenon of total internal reflection, from the light source to the at least one portion of the control member that is both substantially transparent and manually actuatable.

17. The control device of according to claim 1, wherein the at least one portion of the control member that is substantially transparent is manually actuatable.

18. A bicycle control device comprising a movable control member and luminous indicator,
    wherein the luminous indicator comprises: a light source, a light guide configured to guide the light, through the phenomenon of total internal reflection, from the light source to at least one substantially transparent portion of the movable control member.

* * * * *